(12) United States Patent
Gouvine (10) Patent No.: US 11,568,255 B2
(45) Date of Patent: Jan. 31, 2023

(54) FINE TUNING OF TRAINED ARTIFICIAL NEURAL NETWORK

(71) Applicant: Mipsology SAS, Palaiseau (FR)

(72) Inventor: Gabriel Gouvine, Paris (FR)

(73) Assignee: MIPSOLOGY SAS, Palaiseau (FR)

( * ) Notice: Subject to any disclaimer, the term of this patent is extended or adjusted under 35 U.S.C. 154(b) by 260 days.

(21) Appl. No.: 17/016,603

(22) Filed: Sep. 10, 2020

(65) Prior Publication Data

US 2022/0076120 A1 Mar. 10, 2022

(51) Int. Cl.
*G06N 3/08* (2006.01)
*G06F 17/16* (2006.01)
*G06N 3/04* (2006.01)

(52) U.S. Cl.
CPC ............. *G06N 3/082* (2013.01); *G06F 17/16* (2013.01); *G06N 3/0481* (2013.01)

(58) Field of Classification Search
CPC ....... G06N 3/082; G06N 3/0481; G06F 17/16
USPC .......................................................... 706/15
See application file for complete search history.

(56) References Cited

U.S. PATENT DOCUMENTS

| 11,288,567 | B2* | 3/2022 | Schmidt | G06N 3/0454 |
| 2014/0143194 | A1* | 5/2014 | Yoon | G06N 3/049 706/25 |
| 2020/0104717 | A1* | 4/2020 | Alistarh | G06N 3/082 |

* cited by examiner

*Primary Examiner* — Tsu-Chang Lee
(74) *Attorney, Agent, or Firm* — Georgiy L. Khayet (57) ABSTRACT

Systems and methods for fine tuning a trained artificial neural network (ANN) are provided. An example method may include receiving a description of the neurons, a first set of first parameters for the neurons and a second set of second parameters for the neurons; acquiring a plurality of inputs to the neurons, the inputs including first inputs associated with the first set of first parameters and second inputs associated with the second set of second parameters; obtaining first values correlating the first inputs and the second inputs; obtaining second values correlating the first inputs and the second inputs being weighted partially by the first parameters or the second parameters; and determining, based on the first values and the second values, a third set of third parameters to minimize a distance between neurons outputs determined based on the first parameters and neurons outputs determined based the third parameters.

20 Claims, 8 Drawing Sheets

FINE TUNING OF TRAINED ARTIFICIAL NEURAL NETWORK

TECHNICAL FIELD

The present disclosure relates generally to data processing and, more particularly, to a system and method for fine tuning of trained artificial neural network.

BACKGROUND

Artificial Neural Networks (ANNs) are simplified and reduced models reproducing behavior of the human brain. The human brain contains 10-20 billion neurons connected through synapses. Electrical and chemical messages are passed from neurons to neurons based on input information and their resistance to passing information. In the ANNs, a neuron can be represented by a node performing a simple operation of addition coupled with a saturation function. A synapse can be represented by a connection between two nodes. Each of the connections can be associated with an operation of multiplication by a constant. The ANNs are particularly useful for solving problems that cannot be easily solved by classical computer programs.

While forms of the ANNs may vary, they all have the same basic elements similar to the human brain. A typical ANN can be organized into layers, and each of the layers may include many neurons sharing similar functionality. The inputs of a layer may come from a previous layer, multiple previous layers, any other layers, or even the layer itself. Major architectures of ANNs include Convolutional Neural Network (CNN), Recurrent Neural Network (RNN) and Long Term Short Memory (LTSM) network, but other architectures of ANN can be developed for specific applications. While some operations have a natural sequence, for example a layer depending on previous layers, most of the operations can be carried out in parallel within the same layer. The ANNs can then be computed in parallel on many different computing elements similar to neurons of the brain. A single ANN may have hundreds of layers. Each of the layers can involve millions of connections. Thus, a single ANN may potentially require billions of simple operations like multiplications and additions.

Because of the larger number of operations and their parallel nature, ANNs can result in a very heavy load for processing units (e.g., CPU), even ones running at high rates. Sometimes, to overcome limitations of CPUs, graphics processing units (GPUs) can be used to process large ANNs because GPUs have a much higher throughput capacity of operations in comparison to CPUs. Because this approach solves, at least partially, the throughput limitation problem, GPUs appear to be more efficient in the computations of ANNs than the CPUs. However, GPUs are not well suited to the computations of ANNs because the GPUs have been specifically designed to compute graphical images.

The GPUs may provide a certain level of parallelism in computations.

However, the GPUs are constraining the computations in long pipes implying latency and lack of reactivity. To deliver the maximum throughput, very large GPUs can be used, which may involve excessive power consumption, a typical issue of GPUs. Since the GPUs may require more power consumptions for the computations of ANNs, the deployment of GPUs can be difficult.

To summarize, CPUs provide a very generic engine that can execute very few sequences of instructions with a minimum effort in terms of programming, but lack the power of computing for ANN. GPUs are slightly more parallel and require a larger effort of programming than CPUs and can be hidden behind libraries with some performance costs, but are not very suitable for ANNs.

Field Programmable Gate Arrays (FPGAs) are professional components that can be programmed at the hardware level after they are manufactured. The FPGAs can be configured to perform computations in parallel. Therefore, FPGAs can be well suited to compute ANNs. One of the challenges of FPGAs is the programming, which requires a much larger effort than programming CPUs and GPUs. Adaption of FPGAs to perform ANN computations can be more challenging than for CPUs and GPUs.

Most attempts in programming FPGAs to compute ANNs have been focused on a specific ANN or a subset of ANNs, or requiring modification of the ANN structure to fit into a specific limited accelerator, or providing a basic functionality without solving the problem of computing ANN on FPGAs globally. The computation scale is typically not taken into account for existing FPGA solutions, with much of the research being limited to a single or few computation engines. The existing FPGA solutions do not solve the problem of massive data movement required at a large scale for the actual ANN involved in real industrial applications. The inputs to be computed with an ANN are typically provided by an artificial intelligence (AI) framework. Those programs are used by the AI community to develop new ANN or global solutions based on ANN. FPGAs also lack integration in those software environments.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

According to one example embodiment, a system for fine tuning of a trained ANN is provided. The system may include one or more processing units. The processing units may be configured to receive a description of neurons of the ANN, a first set of first parameters for the neurons, and a second set of second parameters for the neurons. The processing units may acquire a plurality of inputs to the neurons. The plurality of inputs may include first inputs associated with the first set of first parameters and second inputs associated with the second set of second parameters. The processing units may obtain first values correlating the first inputs and the second inputs. The processing units may obtain second values correlating the first inputs and the second inputs, where at least a part of the second inputs are weighted by parameters of the first set of first parameters or by parameters of the second set of second parameters. The processing units may determine, based on the first values and the second values, a third set of third parameters, such that a distance between first outputs of neurons and second outputs of neurons is minimized. The first outputs of the neurons are determined based on the first set of first parameters and the second outputs of the neurons are determined based on the third set of third parameters.

The second set of second parameters and the third set of third parameters include a zero parameter at the same positions in the sets. The first parameters, the second parameters, and the third parameters may include one or more of the following: a weight of an input of a neuron, a bias, and a parameter of an activation function.

The second set of the second parameters can be the first set of first parameters, where at least one parameter of the first set of the first parameters has been changed to a different value based on a predetermined criterion. The parameter of the first set of the first parameters can be changed to a different value based on a determination that a value of the at least one parameter is below a threshold. The parameter can be changed to the different value in order to reduce the complexity of the processing of the neural network. In some embodiments, the parameter can be changed to a zero value.

The processing units can be configured to, instead of receiving a second set of second parameters, generate the second set of second parameters from the first set of the first parameters by modifying at least one parameter of the first set of first parameters.

The first values can be arranged in a matrix. Acquiring the plurality of the inputs to the neurons includes generating the inputs based on a set of parameters of the ANN. Alternatively, acquiring the plurality of inputs to the neurons may include receiving the inputs to the neurons.

The neurons may belong to one or more layers of the ANN and a set formed by the neurons is less than a set of all neurons of the ANN. Alternatively, the set formed by the neurons are equal to a set of all neurons of the ANN.

The processing units can be further configured to modify the second set of second parameters by changing parameters of the second set to corresponding parameters of the third set. The processing units are further configured to compute the neurons based on the third set of third parameters.

According to another embodiment, a method for fine tuning of a trained ANN is provided. The method may include receiving, by one or more processing units, a description of the neurons of the ANN, a first set of first parameters for the neurons, and a second set of second parameters for the neurons. The method may include acquiring, by the processing units, a plurality of inputs to the neurons. The plurality of inputs may include first inputs associated with the first set of first parameters and second inputs associated with the second set of second parameters. The method may include obtaining, by the processing units, first values correlating the first inputs and the second inputs. The method may include obtaining, by the processing units, second values correlating the first inputs and the second inputs, where at least a part of the second inputs are weighted by parameters of the first set of first parameters or by parameters of the second set of second parameters. The method may include determining, based on the first values and the second values, a third set of third parameters, such that a distance between first outputs of neurons and second outputs of neurons is minimized. The first outputs of the neurons are determined based on the first set of first parameters and the second outputs of the neurons are determined based the third set of third parameters.

Additional objects, advantages, and novel features will be set forth in part in the detailed description section of this disclosure, which follows, and in part will become apparent to those skilled in the art upon examination of this specification and the accompanying drawings or may be learned by production or operation of the example embodiments. The objects and advantages of the concepts may be realized and attained by means of the methodologies, instrumentalities, and combinations particularly pointed out in the appended claims.

BRIEF DESCRIPTION OF THE DRAWINGS

Embodiments are illustrated by way of example and not limitation in the figures of the accompanying drawings, in which like references indicate similar elements and, in which.

DETAILED DESCRIPTION

The following detailed description includes references to the accompanying drawings, which form a part of the detailed description. The drawings show illustrations in accordance with exemplary embodiments. These exemplary embodiments, which are also referred to herein as "examples," are described in enough detail to enable those skilled in the art to practice the present subject matter. The embodiments can be combined, other embodiments can be utilized, or structural, logical, and electrical changes can be made without departing from the scope of what is claimed. The following detailed description is, therefore, not to be taken in a limiting sense, and the scope is defined by the appended claims and their equivalents.

For purposes of this document, the terms "or" and "and" shall mean "and/or" unless stated otherwise or clearly intended otherwise by the context of their use. The term "a" shall mean "one or more" unless stated otherwise or where the use of "one or more" is clearly inappropriate. The terms "comprise," "comprising," "include," and "including" are interchangeable and not intended to be limiting. For example, the term "including" shall be interpreted to mean "including, but not limited to."

Embodiments of this disclosure are concerned with improving results of computations of trained or pruned ANNs. Pruning an ANN involves replacing weights of the ANN with a zero if the weights do not exceed a threshold. As a result, accuracy of computation based on the pruned ANN may be less than accuracy of the computation based on the original ANN. Existing solutions for improving the accuracy of the pruned ANN involve retraining the pruned ANN using training data sets, typically the same training data sets that were used for the original training of the ANN. The retraining of the ANN can consume both time and computer resources. Unlike existing solutions, embodiments of the present disclosure may allow improving quality of computation of pruned ANNs without retraining the ANN. If an ANN is not pruned, modifying the parameters of the ANN can still be required to match the architecture of the hardware accelerator to the structure of the ANN and, thus, produce results of the computation of the ANN faster than for an unmodified ANN. Embodiments of the present disclosure allow improving the quality of the computation of trained and modified ANNs without retraining the ANN. Embodiments of the present disclosure provide methods for fine tuning parameters of a trained or pruned ANN or a part of the trained or pruned ANN that can be carried out without the training data sets used originally for the training the ANN.

While some embodiments of the present disclosure are described herein in reference to operations of FPGAs, the present technology may be also practiced with application-specific integrated circuits (ASICs), graphical chips (GPU), programmable logic devices, transistor-based circuits, or various combinations thereof. The methods described herein can be also implemented by hardware modules, software modules, or combinations of both. The methods can also be embodied in computer-readable instructions stored on computer-readable media.

The term "module" shall be construed to mean a hardware device, software, or a combination of both. For example, a hardware-based module can use one or more microprocessors, FPGAs, ASICs, programmable logic devices, transistor-based circuits, or various combinations thereof. Software-based modules can constitute computer programs, computer program procedures, computer program functions, and the like. In addition, a module of a system can be implemented by a computer or server, or by multiple computers or servers interconnected into a network. Alternatively, module may also refer to a subpart of a computer system, a hardware device, an integrated circuit, or a computer program.

Technical effects of certain embodiments of the present disclosure can include configuring integrated circuits, FPGAs, or computer systems to improve results of ANN computations by fine tuning parameters of trained or pruned ANN and without retraining the ANN.

Referring now to the drawings, exemplary embodiments are described. The drawings are schematic illustrations of idealized example embodiments. Thus, the example embodiments discussed herein should not be construed as limited to the particular illustrations presented herein, rather these example embodiments can include deviations and differ from the illustrations presented herein.

Figure 1:
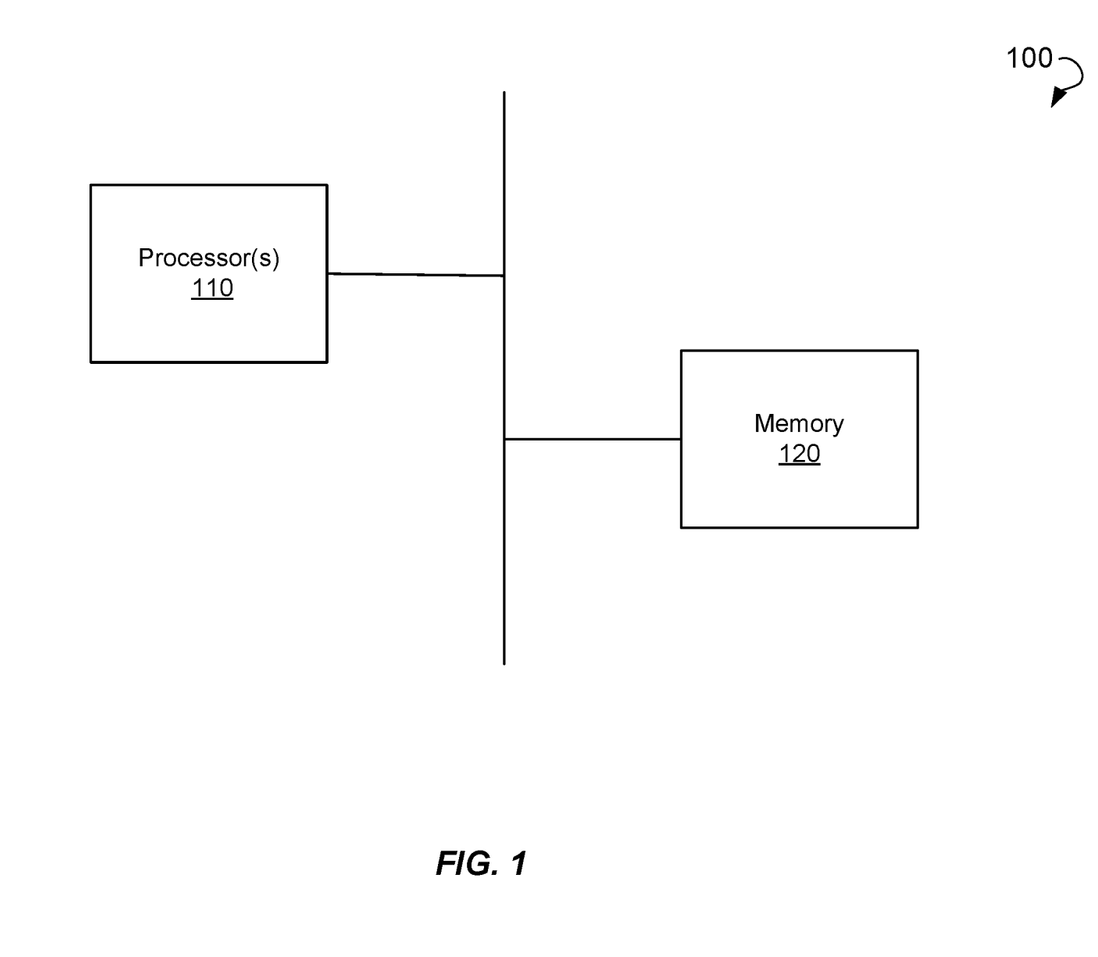
FIG. 1 is a block diagram showing an example system wherein a method for fine tuning trained ANNs can be implemented, according to some example embodiments.

FIG. 1 is a block diagram showing an example system 100, wherein a method for fine tuning an ANN can be implemented, according to some example embodiments. The system 100 can be a part of a computing system, such as a personal computer, a server, a cloud-based computing recourse, and the like. The system 100 may include one or more processing unit(s) 110 and a memory 120. The memory 120 may include computer-readable instructions for execution by the processing unit(s) 110. The processing unit(s) 110 may include a programmable processor, such as a microcontroller, CPU, and so forth. In other embodiments, the processing unit(s) 110 may include an application-specific integrated circuit(s), such as a CPU or a GPU, or programmable logic array(s), such as an FPGA(s), designed to implement the functions performed by the system 100. In various embodiments, the system 100 may be installed on a remote server or may be provided via a cloud service residing in a cloud storage.

The processing unit(s) 110 may be configured to receive a description of the neurons of an ANN, a first set of first parameters for the neurons, and a second set of second parameters for the neurons. The processing unit(s) 110 can receive or calculate a plurality of inputs to the neurons. The plurality of inputs may include first inputs associated with the first set of first parameters and second inputs associated with the second set of second parameters. The first parameters and the second parameters can be weights to input values to the neurons, biases to the neurons, and parameters of activation function used to calculate outputs of neurons. In some embodiments, the first inputs and the second inputs may be the same inputs values to the neurons. In other embodiments, the first inputs and the second inputs may be different. In other embodiments, the first inputs and the second inputs may include one or more common input values to the neurons. In some embodiments, the second set of the second parameters can be obtained from the first set of the first parameters as a result of pruning the ANN. The process of pruning of the ANN is described below in connection with FIG. 3. As result, the second set of the second parameters may include zero values at some positions at which the first set of the first values includes non-zero values. In some embodiments, the second set of the second parameters can be obtained from the first set of the first parameters as results of changing values of the first parameters to fit the constrains of a hardware accelerator.

The processing unit(s) 110 can obtain first values correlating the first inputs and the second inputs. In certain embodiments, the first values can be arranged in a matrix. The processing unit(s) 110 may obtain second values correlating the first inputs and the second inputs, wherein some or all second values are weighted by parameters of the first set of first parameters or by parameters of the second set of second parameters. The processing unit(s) may further determine, based on the first values and the second values, a third set of third parameters, such that a distance between first outputs of neurons and second outputs of neurons is minimized, wherein the first outputs of the neurons are determined based on the first set of first parameters and the second outputs of the neurons are determined based on the third set of third parameters. In some embodiments, the third set of third parameters and the second set of the second parameters may have the same structure; that is, zero values in the third set of third parameters may collocate with zero values in the second set of the second parameters and non-zero-values in the third set of the third parameters may collocate with the non-zero values in the second set of the second parameters. The processing unit(s) 110 may further compute outputs of the neurons based on the third set of the third parameters.

Figure 2:
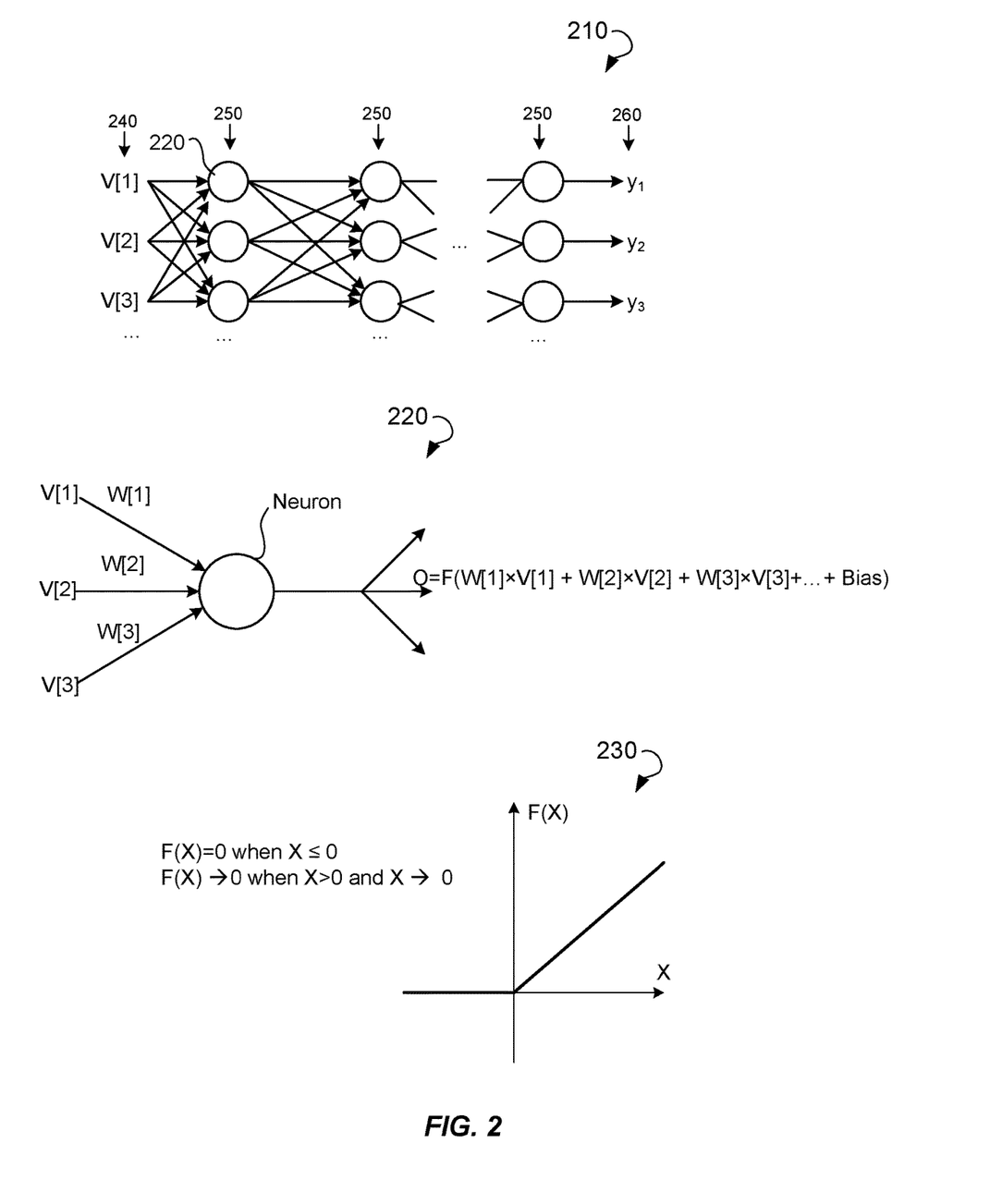
FIG. 2 shows an ANN, neuron, and transfer function, according to an example embodiment.

FIG. 2 shows ANN 210, neuron 220, and transfer function 230, according to some example embodiments. The ANN 210 may include one or more input layers 240, one or more hidden layers 250, and one or more output layers 260. Each of the input layers, hidden layers, and output layers may include one or more (artificial) neurons 220. The number of neurons can be different for different layers.

Each of neurons 220 may represent a calculation of a mathematical function $$O = F\left(\sum_{i=1}^{n} V[i] \times W[i] + \text{bias}\right) \tag{1}$$

wherein V[i] are input values to a neuron, W[i] are weights assigned to the input values to the neuron, bias is an offset to a weighted sum of the input values, and F(X) is a transfer function. Typically, the transfer function 230 F(X) is selected to be zero for X<0 and have a limit of zero as X approaches zero. For example, the transfer function F(X) can be in the form of a sigmoid. The result of the calculation of a neuron can propagate as an input value of further neurons in the ANN. The further neurons can belong to either a next layer, a previous layer, or the same layer.

It should be noted that while the ANN 210 illustrated in FIG. 2 can be referred to as a feedforward neural network, embodiments of the present disclosure can be also used in computations of CNNs, RNNs, LSTM networks, and other types of ANNs.

Figure 3:
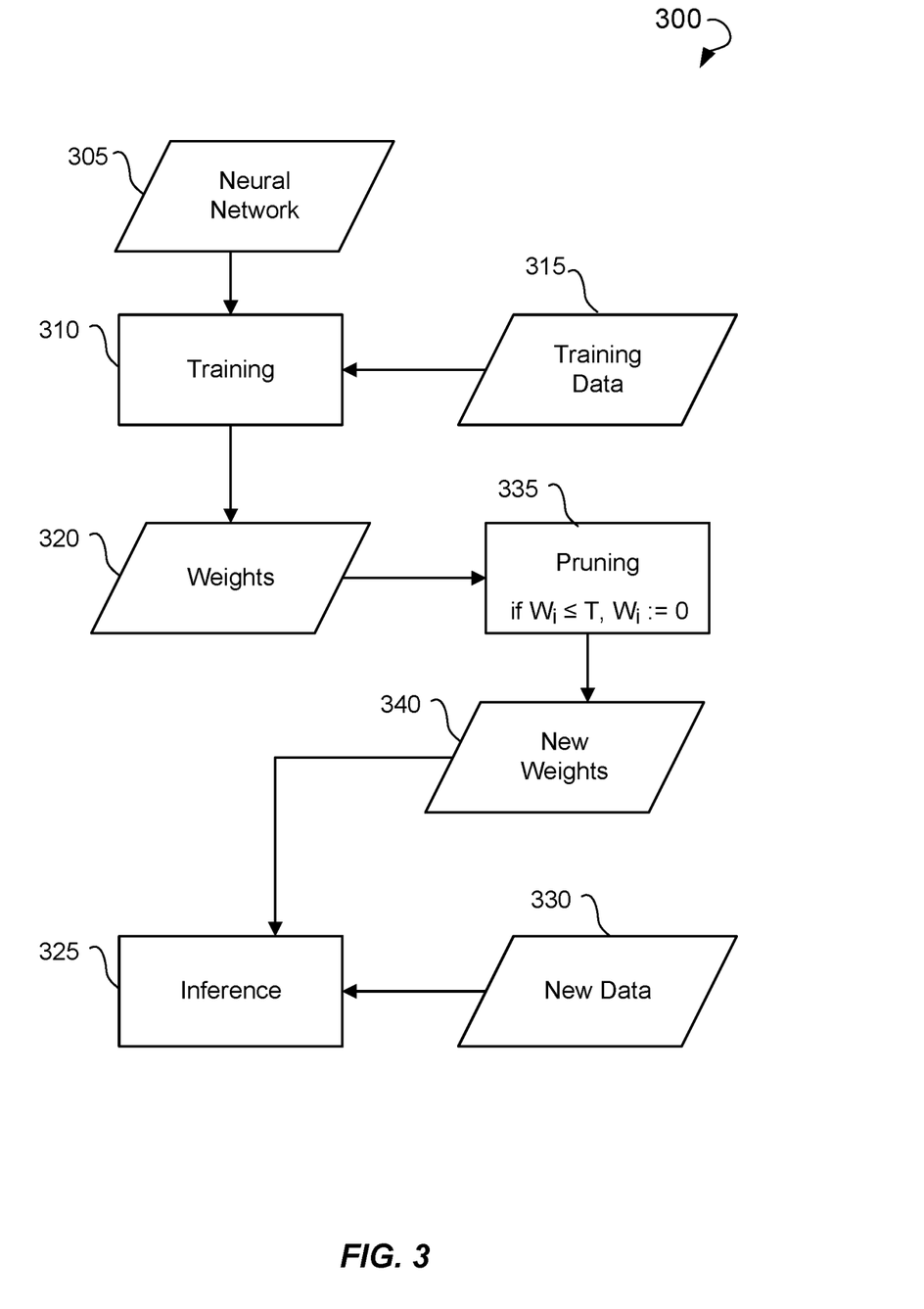
FIG. 3 is a flow chart showing training and inference of ANN, according to some example embodiments.

FIG. 3 is a flow chart 300 showing training 310 and inference 325 of an ANN, according to some example embodiments. The training 310 (also known as learning) is a process of teaching ANN 305 to output a proper result based on a given set of training data 315. The process of training may include determining weights 320 of neurons of the ANN 305 based on training data 315. The training data 315 may include samples. Each of the samples may be represented as a pair of input values and an expected output. The training data 315 may include hundreds to millions of samples. While the training 310 is required to be performed only once, it may require a significant amount of computations and take a considerable time. The ANNs can be configured to solve different tasks including, for example, image recognition, speech recognition, handwriting recognition, machine translation, social network filtering, video games, medical diagnosis, and so forth.

The inference 325 is a process of computation of an ANN. The inference 325 uses the trained ANN weights 320 and new data 330 including new sets of input values. For each new set of input values, the computation of the ANN provides a new output that answers the problem that the ANN is supposed to solve. For example, an ANN can be trained to recognize various animals in images. Correspondingly, the ANN can be trained on millions of images of animals. Submitting a new image to the ANN would provide the information for animals in the new image (this process being known as image tagging). While the inference for each image takes less computations than training, the number of inferences can be large because new images can be received from billions of sources.

The inference 325 includes multiple computations of sum of products:

$$\sum_{i=1}^{n} V[i] \times W[i] \quad (2)$$

wherein the V[i] are new input values and W[i] are weights associated with neurons of ANN. Some previous approaches for performing inference include inspection of the weights W[i] and replacing some of the weights W[i] with zero values if a value of the weight is relatively small when compared to other weights of the ANN. In FIG. 3, this process is shown as pruning 335. The pruning 335 generates new weights 340 that then can be used in inference 325 instead of the weights 320. An advantage of these approaches is that replacing the weights with zero values may allow decreasing the number of computations of the ANN, since multiplications by zero can be avoided in computations. The disadvantage of these approaches is that the ANN can become less accurate in producing a correct output due to lack of correspondence between the new weights 340 and training data 315 used in training of ANN. Embodiments of the present disclosure provide methods for fine tuning parameters of the pruned ANN to improve accuracy of ANN computations.

Figure 4:
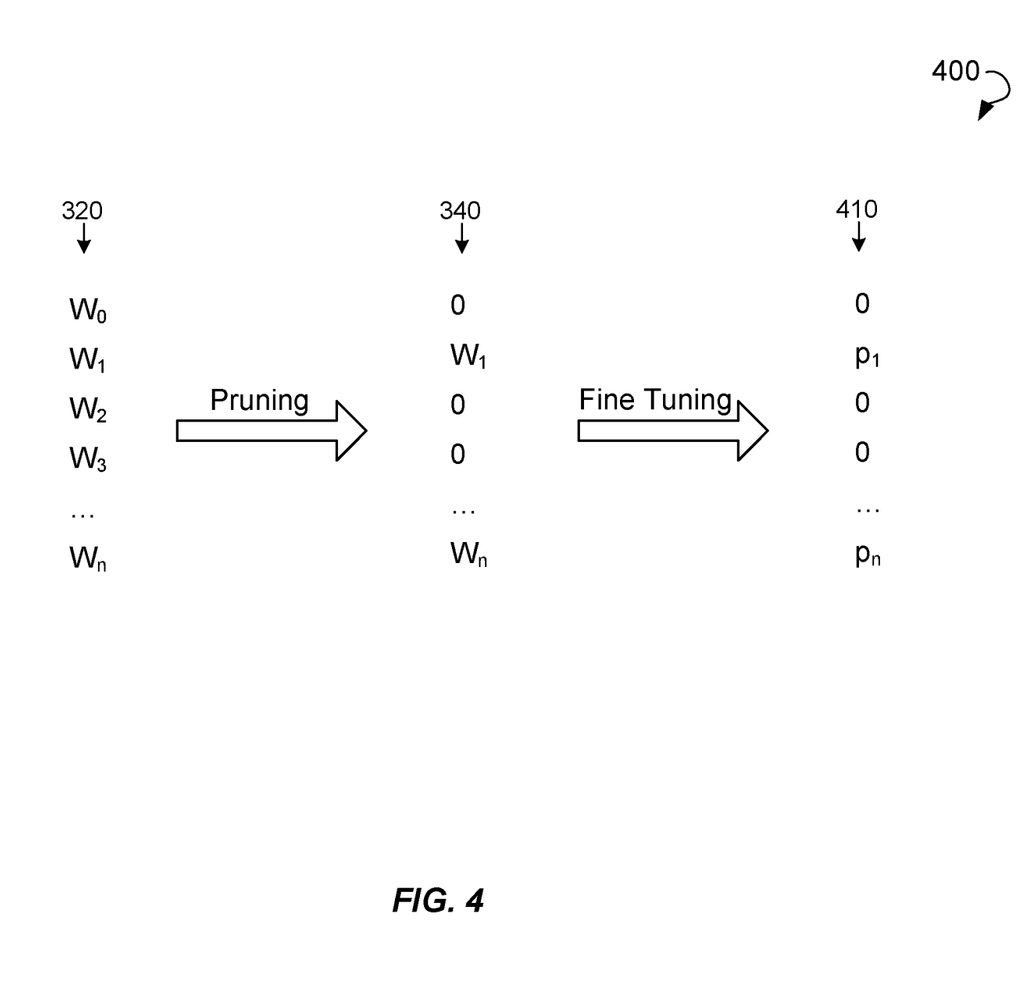
FIG. 4 is schematic showing a process of trained ANN and fine tuning the pruned ANN, according to an example embodiment.

FIG. 4 is schematic 400 showing a process of pruning an ANN and fine tuning the pruned ANN, according to an example embodiment. In example of FIG. 4, weights 320 are weights of ANN obtained in training 310 (shown in FIG. 3) and weights 340 are weights of the ANN after pruning (for example, pruning 335 as described in FIG. 3). In general, the weights 320 are part of a first set of first parameters (weights, biases, and parameters of activation functions) of the ANN obtained in training 310 and the weights 340 are part of a second set of second parameters of the ANN, where the second set of second parameters can be obtained by modifying the first set of first parameters. The weights 340 include zero parameters at one or more positions at which the weights 320 include non-zero parameters. A weight W[i] from the weights 320 can be assigned to a zero based on a criterion. For example, the weight W[i] may be assigned to a zero if the weight W[i] is less than a threshold T. According to one embodiment of the present disclosure, the weights 340 can be modified (fine-tuned) based on a pre-determined criterion to improve accuracy calculations of the ANN. The fine-tuned weights 410 may include zero values at the same positions as the zero values in the weights 340.

Figure 5:
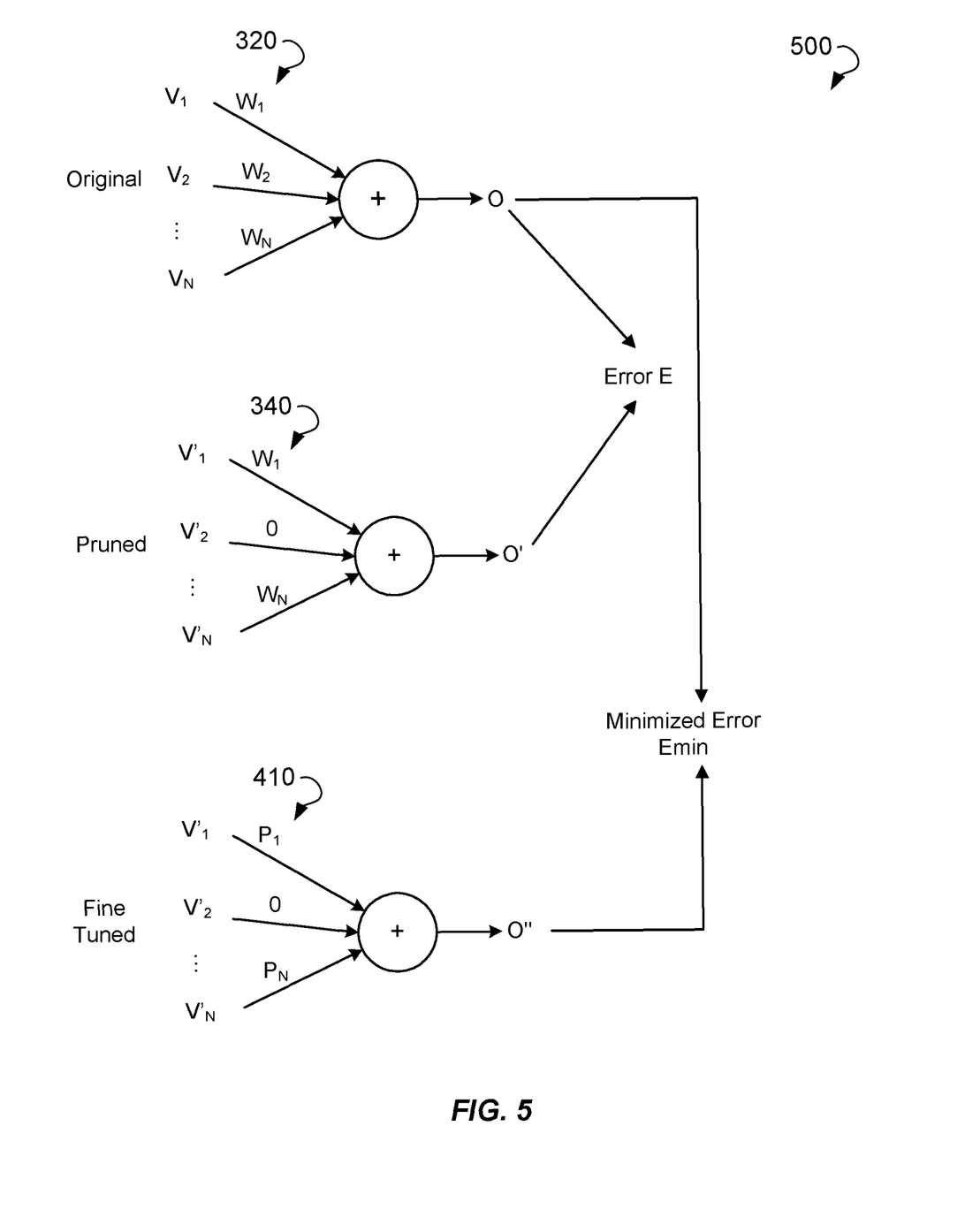
FIG. 5 is schematic showing a process of computing neurons, according to an example embodiment.

FIG. 5 is schematic 500 showing computations of a weight 320, according to an example embodiment. Neuron output O is computed using first input values V[i] and weights 320 (shown in FIG. 3 and FIG. 4). Neuron output O' is computed using second input values V'[i] and weights 340 (shown in FIG. 3 and FIG. 4). The first input values V[i] and the second input values V'[i] may be the same. Due to differences between the pruned weights 340 and the weights 320, the neuron output O' differs from the neuron output O by an error E. Embodiments of the present disclosure may allow modifying the pruned weights 340 to obtain fine-tuned weights 410 (shown in FIG. 3) such that the difference between the neuron output O and the neuron output O'' would correspond to minimum difference $E_{min}$.

In general, for one or more neurons and one or more sets of inputs values $\{d_{is}\}$ to the neurons, the fine-tuned weights 410 correspond to a minimum of the following objective function:

$$\sum_s \left( \sum_i W_i d_{is} - \sum_i p_i d_{is} \right)^2 \quad (3)$$

where s is an index of a set from the set of input values, i is an index of an input value $d_{is}$ to neurons, $W_i$ is an original weight (one of the weights 320) to the input value $d_{is}$, and $p_i$ is a fine-tuned weight (one of the weights 410).

In a matrix form, the equation (3) can be written as $$^TPQP + {^T}CP + D \quad (4)$$

where elements of matrix Q are:

$$Q_{ij} = \sum_s d_{is} d_{js} \quad (5)$$

and elements of vector C are:

$$C_i = -2 \sum_s \sum_j d_{is} W_j d_{js} \quad (6)$$

The matrix Q includes values $Q_{ij}$ correlating input values $d_{is}$ associated with the weights $W_i$ to input values $d_{js}$ associated with to be determined weights $p_i$. The vector C includes values $C_i$ correlating input values $d_{is}$ associated with the weights $W_i$ to input values $d_{js}$ associated with to be determined weights $p_j$, where input values $d_{js}$ are weighted by the weights $W_i$. The weights $W_i$ are parameters from the first set of first parameters or parameters from the second set of second parameters.

The fine-tuned weights $p_i$ can be determined by solving the following equation:

$$2QP = C \qquad (7)$$

While the equations (3)-(7) are concerned with determining optimal weights $p_i$, further or similar equations can be obtained to determine optimal values for biases to the neurons or optimal values for parameters of activation functions.

Figure 6:
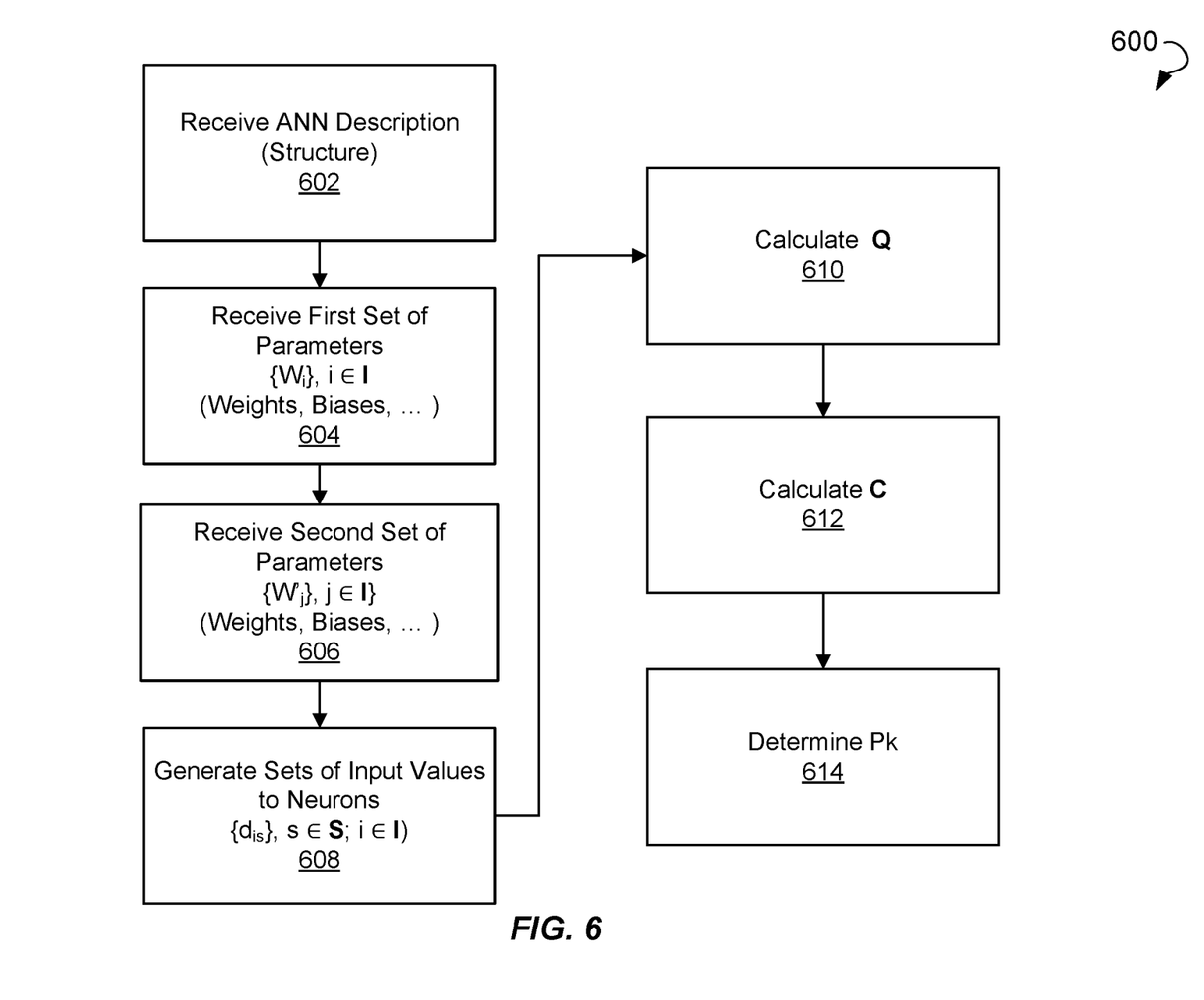
FIG. 6 is a flow chart of a method for fine tuning a trained ANN, according to an example embodiment.

FIG. 6 is a flow chart of a method 600 for fine tuning a trained or pruned ANN, according to an example embodiment. The method 600 can be implemented by the system 100 shown in FIG. 1.

In block 602, the method 600 may commence with receiving description of a part of the ANN. The description may include a number of neurons, structure of the neurons, relations between different neurons, structure of layers of the part of the ANN, relations between neurons of the different layers, and so forth. In some embodiments, the description can be provided only for neurons within the same layer of the ANN. In other embodiments, the description can be provided for neurons belonging to at least two different layers of the ANN. In some embodiments, the description can be provided only for a proper subset of all neurons of the ANN. In some embodiments, the description can be provided for a set of all neurons of the ANN.

In block 604, the method 600 may include receiving a first set of first parameters of the ANN. The first set of first parameters may include the weights $W_i$ associated with the neurons, biases to the neurons, parameters of activation functions used to compute the neurons, and so forth.

In block 606, the method 600 may include receiving a second set of second parameters of the ANN. The second set of second parameters may include the weights $W'_j$ associated with the neurons, offsets to the neurons, parameters of activation functions used to compute the neurons, and so forth. In some embodiments, the second set of second parameters are obtained from the first set of first parameters by pruning the ANN. Specifically, for some indexes i=j, the weight $W'_j = 0$, and the weight $W_i \neq 0$.

In block 608, the method 600 may include either receiving or generating sets of input values $d_{is}$, where the i is an index of a neuron and s is an index of a set in the sets of the input values. In some embodiments, the input values $d_{is}$ can be calculated by reversing the ANN using the first set of first parameters. In other embodiments, the input values $d_{is}$ can be calculated by reversing the ANN using the second set of second parameters.

In block 610, the method 600 may include calculating matrix Q using the formula (5). The matrix Q includes values correlating the inputs values in the sets of the input values $d_{is}$.

In block 612, the method 600 may include calculating vector C using formula (6). The vector C includes values correlating the input values $d_{is}$ with input values $d_{js}$ weighted by the corresponding weights $W_j$.

In block 614, the method 600 may include computing a new set of parameters of the ANN by solving the equation (7). The new set of parameters may include new weights $P_k$, new biases to the neurons, or new parameters of activation functions.

Figure 7:
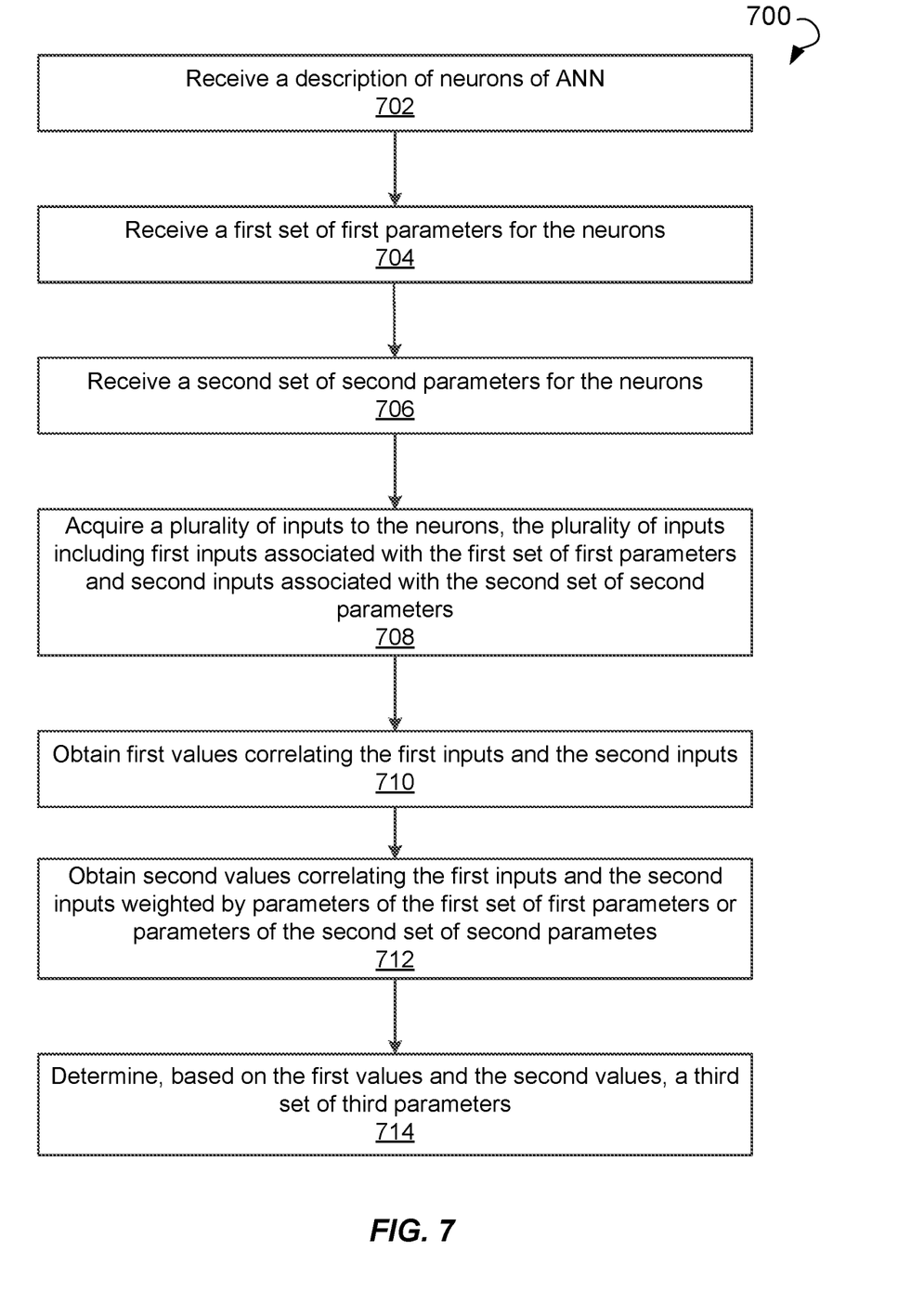
FIG. 7 is a flow chart of a method for fine tuning a trained ANN, according to some example embodiments.

FIG. 7 is a flow chart illustrating a method 700 for fine tuning a trained ANN, in accordance with some example embodiments. In some embodiments, the operations of the method 700 may be combined, performed in parallel, or performed in a different order. The method 700 may also include additional or fewer operations than those illustrated. The method 700 may be performed by system 100 described above with reference to in FIG. 1.

In block 702, the method 700 may include receiving, by one or more processing units, a description of neurons of an ANN. In some embodiments, the neurons may belong to the same layer of the ANN. In other embodiments, the neurons may belong to at least two different layers of the ANN. In certain embodiments, a set formed by the neurons can be less than a set of all neurons of the ANN. In other embodiments, the neurons form the set of all neurons of the ANN.

In block 704, the method 700 may include receiving, by the one or more processing units, a first set of first parameters for the neurons.

In block 706, the method 700 may include receiving, by the processing units, a second set of second parameters for the neurons. The second set of the second parameters can be the first set of first parameters, where at least one parameter of the first set of the first parameters has been changed to a different value based on a predetermined criterion. For example, a parameter of the first set of the first parameters can be changed to a different value based on a determination that a value of the parameter is below a threshold. The parameter can be changed to the different value to simplify computation of the ANN on a hardware accelerator, for example, the parameter can be changed to a zero value to bypass an operation. The second parameters and the first parameters may include one or more of the following: a weight of an input of a neuron, a bias, and a parameter of an activation function. In some embodiments, instead of the receiving the second set of second parameters, the method 700 may include, in block 706, generating the second set of second parameters from the first set of the first parameters by modifying one or more parameters of the first set of first parameters.

In block 708, the method 700 may include acquiring, by the processing units, a plurality of inputs to the neurons. The plurality of inputs may include first inputs associated with the first set of first parameters and second inputs associated with the second set of second parameters. In some embodiments, the inputs to the neurons can be generated based on a set of parameters of the ANN.

In block 710, the method 700 may include obtaining, by the processing units, first values correlating the first inputs and the second inputs. The first values can be arranged in a matrix.

In block 712, the method 700 may include obtaining, by the processing units, second values correlating the first inputs and the second inputs, wherein some of the second inputs are weighted by parameters of the first set of first parameters or by parameters of the second set of second parameters.

In block 714, the method 700 may include determining, by the processing units, based on the first values and the second values, a third set of third parameters. The third parameters correspond to the minimum of a distance between first outputs of neurons and second outputs of neurons. The first outputs of the neurons are determined based on the first set of first parameters. The second outputs of the neurons are determined based the third set of third parameters. In some embodiments, the second set of second parameters and the third set of third parameters may include zero parameters at the same positions in the sets.

The method 700 may further include modifying, by the processing units, the second set of second parameters by changing parameters of the second set to corresponding parameters of the third set. The method 700 may further include computing, by the processing units, the neurons based on the third set of third parameters.

Figure 8:
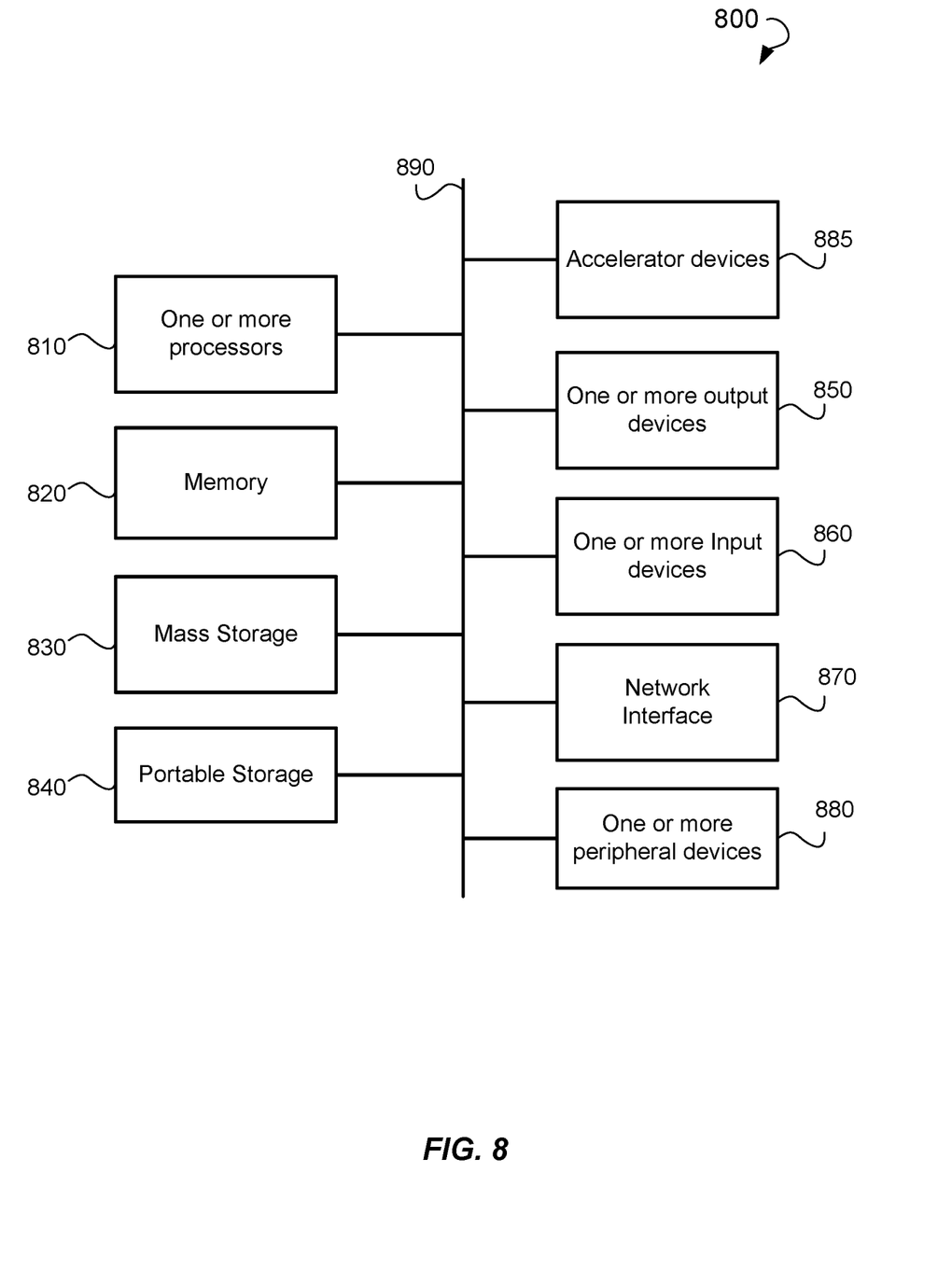
FIG. 8 shows a computing system that can be used to implement embodiments of the disclosed technology.

FIG. 8 illustrates an example computing system 800 that may be used to implement embodiments described herein. The example computing system 800 of FIG. 8 may include one or more processors 810 and memory 820. Memory 820 may store, in part, instructions and data for execution by the one or more processors 810. Memory 820 can store the executable code when the exemplary computing system 800 is in operation. The processor 810 may include internal accelerators like a graphical processing unit, a FPGA, or similar accelerators that may be suitable for use with embodiments described herein. The memory 820 may include internal accelerators like a GPU, a FPGA, or similar accelerators that may be suitable for use with embodiments described herein. The example computing system 800 of FIG. 8 may further include a mass storage 830, portable storage 840, one or more output devices 850, one or more input devices 860, a network interface 870, and one or more peripheral devices 880.

The components shown in FIG. 8 are depicted as being connected via a single bus 890. The components may be connected through one or more data transport means. The one or more processors 810 and memory 820 may be connected via a local microprocessor bus, and the mass storage 830, one or more peripheral devices 880, portable storage 840, and network interface 870 may be connected via one or more input/output buses.

Mass storage 830, which may be implemented with a magnetic disk drive, an optical disk drive or a solid state drive, is a non-volatile storage device for storing data and instructions for use by a magnetic disk, an optical disk drive or SSD, which in turn may be used by one or more processors 810. Mass storage 830 can store the system software for implementing embodiments described herein for purposes of loading that software into memory 820. The mass storage 830 may also include internal accelerators like a graphical processing unit, a FPGA, or similar accelerators that may be suitable for use with embodiments described herein.

Portable storage 840 may operate in conjunction with a portable non-volatile storage medium, such as a compact disk (CD) or digital video disc (DVD), to input and output data and code to and from the computing system 800 of FIG. 8. The system software for implementing embodiments described herein may be stored on such a portable medium and input to the computing system 800 via the portable storage 840.

One or more input devices 860 provide a portion of a user interface. The one or more input devices 860 may include an alphanumeric keypad, such as a keyboard, for inputting alphanumeric and other information, or a pointing device, such as a mouse, a trackball, a stylus, or cursor direction keys. Additionally, the computing system 800 as shown in FIG. 8 includes one or more output devices 850. Suitable one or more output devices 850 include speakers, printers, network interfaces, and monitors.

Network interface 870 can be utilized to communicate with external devices, external computing devices, servers, and networked systems via one or more communications networks such as one or more wired, wireless, or optical networks including, for example, the Internet, intranet, LAN, WAN, cellular phone networks (e.g., Global System for Mobile communications network, packet switching communications network, circuit switching communications network), Bluetooth radio, and an IEEE 802.11-based radio frequency network, among others. Network interface 870 may be a network interface card, such as an Ethernet card, optical transceiver, radio frequency transceiver, or any other type of device that can send and receive information. Other examples of such network interfaces may include Bluetooth®, 3G, 4G, and WiFi® radios in mobile computing devices as well as a USB.

One or more peripheral devices 880 may include any type of computer support device to add additional functionality to the computing system. The one or more peripheral devices 880 may include a modem or a router.

The example computing system 800 of FIG. 8 may also include one or more accelerator devices 885. The accelerator devices 885 may include PCIe-form-factor boards or storage-form-factor boards, or any electronic board equipped with a specific electronic component like a GPU, a Neural Processing Unit, a Multi-CPU component, a FPGA component, or similar electronic or photonic components, that may be suitable for use with embodiments described herein.

The components contained in the exemplary computing system 800 of FIG. 8 are those typically found in computing systems that may be suitable for use with embodiments described herein and are intended to represent a broad category of such computer components that are well known in the art. Thus, the exemplary computing system 800 of FIG. 8 can be a personal computer, handheld computing device, telephone, mobile computing device, workstation, server, minicomputer, mainframe computer, or any other computing device. The computer can also include different bus configurations, networked platforms, multi-processor platforms, and so forth. Various operating systems (OS) can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the example embodiments. Those skilled in the art are familiar with instructions, processor(s), and storage media.

It is noteworthy that any hardware platform suitable for performing the processing described herein is suitable for use with the example embodiments. The terms "computer-readable storage medium" and "computer-readable storage media" as used herein refer to any medium or media that participate in providing instructions to a CPU for execution. Such media can take many forms, including, but not limited to, non-volatile media, volatile media, and transmission media. Non-volatile media include, for example, optical or magnetic disks, such as a fixed disk. Volatile media include dynamic memory, such as RAM. Transmission media include coaxial cables, copper wire, and fiber optics, among others, including the wires that include one embodiment of a bus. Transmission media can also take the form of acoustic or light waves, such as those generated during radio frequency and infrared data communications. Common forms of computer-readable media include, for example, a floppy disk, a flexible disk, a hard disk, magnetic tape, any other magnetic medium, SSD, a CD-read-only memory (ROM) disk, DVD, any other optical medium, any other physical medium with patterns of marks or holes, a RAM, a PROM, an EPROM, an EEPROM, a FLASHEPROM, any other memory chip or cartridge, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. The instructions or data may not be used by the CPU but be accessed in writing or reading from the other devices without having the CPU directing them.

Thus, systems and methods for fine tuning of a trained ANN are described. Although embodiments have been described with reference to specific exemplary embodiments, it will be evident that various modifications and changes can be made to these exemplary embodiments without departing from the broader spirit and scope of the present application. Accordingly, the specification and drawings are to be regarded in an illustrative rather than a restrictive sense.

What is claimed is:

1. A system for fine tuning of a trained artificial neural network (ANN), the system comprising one or more processing units and a memory storing programmable instructions, wherein upon executing the programmable instructions, the one or more processing units are configured to:
   receive a description of neurons of the ANN;
   receive a first set of first parameters for the neurons;
   receive a second set of second parameters for the same neurons, the second set of second parameters being structured to match an architecture of a hardware accelerator configured to calculate outputs of the neurons of the ANN;
   acquire a plurality of inputs to the neurons, the plurality of inputs including first inputs associated with the first set of first parameters and second inputs associated with the second set of second parameters;
   obtain first values correlating the first inputs and the second inputs;
   obtain second values correlating the first inputs and the second inputs, wherein at least a part of the second inputs are weighted by one of the following: parameters of the first set of the first parameters or parameters of the second set of the second parameters;
   determine, based on the first values and the second values, a third set of third parameters, such that a distance between first outputs of neurons and second outputs of neurons is minimized, wherein the first outputs of the neurons are determined based on the first set of first parameters and the second outputs of the neurons are determined based the third set of third parameters; and
   providing the third set of third parameters to the hardware accelerator for computing the outputs of the neurons of the ANN, thereby causing the hardware accelerator to increase an accuracy of calculation of the ANN.

2. The system of claim 1, wherein the second set of second parameters and the third set of third parameters include a zero parameter at at least one same position.

3. The system of claim 1, wherein the first parameters, the second parameters, and the third parameters include one or more of the following: a weight of an input of a neuron, a bias, and a parameter of an activation function.

4. The system of claim 1, wherein the second set of the second parameters is the first set of first parameters, wherein at least one parameter of the first set of the first parameters has been changed to a zero based on a predetermined criterion.

5. The system of claim 4, wherein the at least one parameter of the first set of the first parameters has been changed to zero based on a determination that a value of the at least one parameter is below a threshold.

6. The system of claim 1, wherein the one or more processing units are configured to, instead of the receiving a second set of second parameters, generate the second set of second parameters from the first set of the first parameters by modifying at least one parameter of the first set of first parameters.

7. The system of claim 1, wherein the first values are arranged in a matrix.

8. The system of claim 1, wherein the acquiring the plurality of the inputs to the neurons includes generating the inputs based on a set of parameters of the ANN.

9. The system of claim 1, wherein the acquiring the plurality of inputs to the neurons includes receiving the inputs to the neurons.

10. The system of claim 1, wherein the neurons belong to one or more layers of the ANN and a set formed by the neurons is less than a set of all neurons of the ANN.

11. The system of claim 1, wherein a set formed by the neurons is equal to a set of all neurons of the ANN.

12. The system of claim 1, wherein the one or more processing units are further configured to modify the second set of second parameters by changing parameters of the second set to corresponding parameters of the third set.

13. The system of claim 1, wherein the one or more processing units are further configured to compute the neurons based on the third set of third parameters.

14. A method for fine tuning of a trained artificial neural network (ANN), the method comprising:
   receiving, by one or more processing units, a description of neurons of the ANN;
   receiving, by the one or more processing units, a first set of first parameters for the neurons;
   receiving, by the one or more processing units, a second set of second parameters for the same neurons, the second set of second parameters being structured to match an architecture of a hardware accelerator configured to calculate outputs of the neurons of the ANN;
   acquiring, by the one or more processing units, a plurality of inputs to the neurons, the plurality of inputs including first inputs associated with the first set of first parameters and second inputs associated with the second set of second parameters;
   obtaining, by the one or more processing units, first values correlating the first inputs and the second inputs;
   obtaining, by the one or more processing units, second values correlating the first inputs and the second inputs, wherein at least a part of the second inputs are weighted by one of the following: parameters of the first set of first parameters or parameters of the second set of second parameters; and
   determining, by the one or more processing units and based on the first values and the second values, a third set of third parameters, such that a distance between first outputs of neurons and second outputs of neurons is minimized, wherein the first outputs of the neurons are determined based on the first set of first parameters and the second outputs of the neurons are determined based the third set of third parameters; and providing the third set of third parameters to the hardware accelerator for computing the outputs of the neurons of the ANN, thereby causing the hardware accelerator to increase an accuracy of calculation of the ANN.

15. The method of claim 14, wherein the second set of second parameters and the third set of third parameters include a zero parameter at at least one same position.

16. The method of claim 14, wherein the first parameters, the second parameters, and the third parameters include one or more of the following: a weight of an input of a neuron, a bias, and a parameter of an activation function.

17. The method of claim 14, wherein the second set of the second parameters is the first set of first parameters, wherein at least one parameter of the first set of the first parameters has been changed to a zero based on a predetermined criterion.

18. The method of claim 17, wherein the at least one parameter of the first set of the first parameters has been changed to zero based on a determination that a value of the at least one parameter is below a threshold.

19. The method of claim 14, further comprising computing the neurons based on the third set of third parameters.

20. A system for fine tuning of a trained artificial neural network (ANN), the system comprising one or more processing units and a memory storing programmable instructions, wherein upon executing the programmable instructions, the one or more processing units are configured to:
   receive a description of neurons of the ANN;
   receive a first set of first parameters for the neurons;
   receive a second set of second parameters for the neurons, the second set of second parameters being the first set of first parameters modified to match an architecture of a hardware accelerator, the hardware accelerator being configured to calculate outputs of the neurons of the ANN and bypass an operation involving at least one parameter of the second set of second parameters;
   acquire a plurality of inputs to the neurons, the plurality of inputs including first inputs associated with the first set of first parameters and second inputs associated with the second set of second parameters;
   obtain first values correlating the first inputs and the second inputs;
   obtain second values correlating the first inputs and the second inputs, wherein at least a part of the second inputs are weighted by one of the following: parameters of the first set of first parameters or parameters of the second set of second parameters;
   determine, based on the first values and the second values, a third set of third parameters, such that a distance between first outputs of neurons and second outputs of neurons is minimized, wherein the first outputs of the neurons are determined based on the first set of first parameters and the second outputs of the neurons are determined based the third set of third parameters; and
   provide the third set of third parameters to the hardware accelerator for computing the outputs of the neurons of the ANN, thereby causing the hardware accelerator to increase accuracy of calculation of the ANN.

\* \* \* \* \*